United States Patent
Koga et al.

(10) Patent No.: US 12,022,424 B2
(45) Date of Patent: Jun. 25, 2024

(54) POSITION DETECTION SYSTEM AND POSITION DETECTION METHOD

(71) Applicant: KABUSHIKI KAISHA TOKAI RIKA DENKI SEISAKUSHO, Aichi (JP)

(72) Inventors: Kenichi Koga, Aichi (JP); Tetsuya Kobayashi, Toyota (JP); Takahiro Shimizu, Toyota (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 334 days.

(21) Appl. No.: 17/438,558

(22) PCT Filed: Feb. 27, 2020

(86) PCT No.: PCT/JP2020/008015
§ 371 (c)(1),
(2) Date: Sep. 13, 2021

(87) PCT Pub. No.: WO2020/195513
PCT Pub. Date: Oct. 1, 2020

(65) Prior Publication Data
US 2022/0150864 A1    May 12, 2022

(30) Foreign Application Priority Data
Mar. 22, 2019   (JP) .................... 2019-055170

(51) Int. Cl.
*H04W 64/00*    (2009.01)
*G01S 7/36*    (2006.01)
*G01S 13/76*    (2006.01)

(52) U.S. Cl.
CPC ............ *H04W 64/003* (2013.01); *G01S 7/36* (2013.01); *G01S 13/767* (2013.01)

(58) Field of Classification Search
CPC ....... H04W 64/003; G01S 7/36; G01S 13/767
(Continued)

(56) References Cited

U.S. PATENT DOCUMENTS

2006/0044181 A1\* 3/2006 Wilcox ................. G01S 13/825
342/194
2008/0231498 A1\* 9/2008 Menzer ................. G01S 13/765
342/134

(Continued)

FOREIGN PATENT DOCUMENTS

JP    2006-510013    3/2006
JP    2008-533436    8/2008

(Continued)

OTHER PUBLICATIONS

International Search Report issued in International Bureau of WIPO Patent Application No. PCT/JP2020/008015, dated Jun. 2, 2020.

*Primary Examiner* — Ahmad F. Matar
*Assistant Examiner* — Jirapon Tulop
(74) *Attorney, Agent, or Firm* — GREENBLUM & BERNSTEIN P.L.C.

(57) ABSTRACT

A position detection system includes a measurement unit that obtains a measurement value related to transmission and reception of radio waves from when the radio waves are transmitted from one of first and second communication devices to the other one of the first and second communication devices to when the one of the first and second communication devices receives a response to the radio waves to detect a positional relationship of the first and second communication devices. The measurement unit obtains multiple measurement values by performing communication to obtain the measurement value a multiple number of times in which a parameter of the communication is changed.

6 Claims, 4 Drawing Sheets

(58) Field of Classification Search
USPC .................................................... 455/456.1
See application file for complete search history.

(56) References Cited

U.S. PATENT DOCUMENTS

| | | | |
|---|---|---|---|
| 2009/0006032 A1* | 1/2009 | Wilcox | ............... G01S 13/825 |
| | | | 702/176 |
| 2010/0026557 A1 | 2/2010 | Wilcox | |
| 2017/0086086 A1 | 3/2017 | Bhatia et al. | |

FOREIGN PATENT DOCUMENTS

| | | | |
|---|---|---|---|
| JP | 2012-112818 | | 6/2012 |
| JP | 2012112818 A | * | 6/2012 |
| JP | 2014-227647 | | 12/2014 |
| JP | 2018-534817 | | 11/2018 |

* cited by examiner

POSITION DETECTION SYSTEM AND POSITION DETECTION METHOD

TECHNICAL FIELD

The present invention relates to a position detection system that detects the positional relationship of a first communication device and a second communication device and a position detection method.

BACKGROUND ART

A known position detection system measures the distance between a terminal and an operated subject through the communication of radio waves between the terminal and the operated subject and determines whether the measured distance is proper (refer to, for example, Patent Document 1). The position detection system, for example, obtains a measurement value corresponding to the distance between the terminal and the operated subject. When determining that the measured value is less than a threshold value, the position detection system, for example, allows ID verification, which is performed through wireless communication between the terminal and the operated subject, to be accomplished. Thus, even when a relay or the like that is located remote from the operated subject is used to establish unauthorized communication and connect to the terminal, such communication will be detected, and unauthorized ID will not be verified.

Patent Document 1: Japanese Laid-Open Patent Publication No. 2014-227647

SUMMARY

With such type of position detection system, there is a need to further improve the accuracy for detecting unauthorized communication.

It is an objective of the present invention to provide a position detection system and a position detection method that improve the accuracy for detecting unauthorized communication.

A position detection system in one embodiment includes a measurement unit that obtains a measurement value related to transmission and reception of radio waves from when the radio waves are transmitted from one of a first communication device and a second communication device to the other one of the first communication device and the second communication device to when the one of the first communication device and the second communication device receives a response to the radio waves to detect a positional relationship of the first communication device and the second communication device. The measurement unit obtains multiple measurement values by performing communication to obtain the measurement value a multiple number of times in which a parameter of the communication is changed.

A method for detecting a position in one embodiment includes obtaining a measurement value related to transmission and reception of radio waves with a measurement unit from when one of a first communication device and a second communication device transmits radio waves to the other one of the first communication device and the second communication device to when the one of the first communication device and the second communication device receives a response to the radio waves to detect a positional relationship of the first communication device and the second communication device. The obtaining a measurement value includes obtaining multiple measurement values with the measurement unit by performing communication to obtain the measurement value a multiple number of times in which a parameter of the communication is changed.

DESCRIPTION OF THE EMBODIMENTS

First Embodiment

A position detection system and a position detection method according to a first embodiment will now be described with reference to FIGS. 1 to 4.

Figure 1:
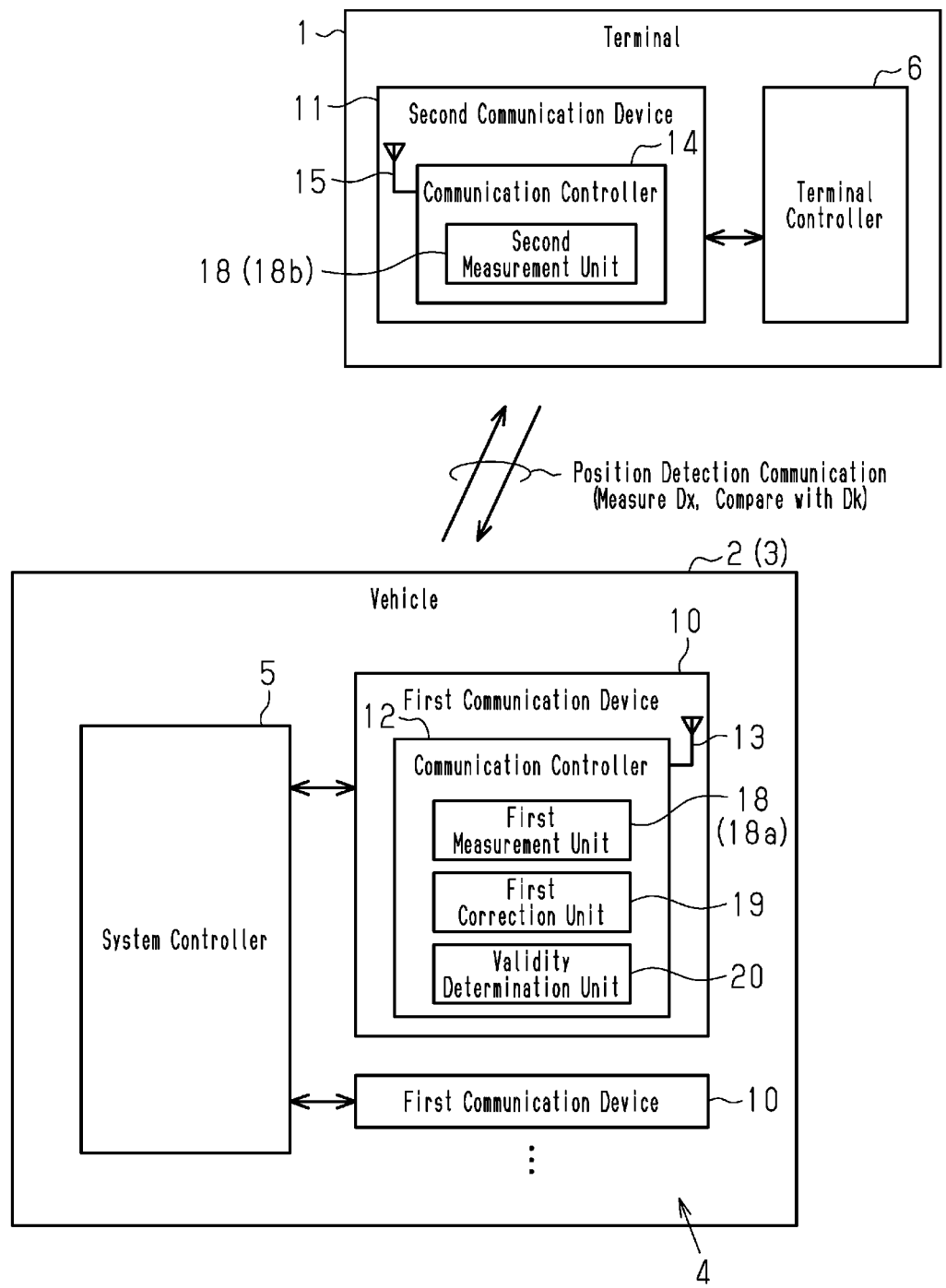
FIG. 1 is a diagram illustrating a position detection system in a first embodiment.

As shown in FIG. 1, a vehicle 3 serving as an operated subject 2 for a terminal 1 includes a position detection system 4 that detects the positional relationship of the vehicle 3 and the terminal 1 through communication with the terminal 1. The position detection system 4 of the present example measures the distance between the vehicle 3 and the terminal 1 through position detection communication between the vehicle 3 and the terminal 1 and determines the positional relationship of the two based on a measurement value Dx. The position detection system 4 is installed in the vehicle 3 so as to prevent unauthorized communication in which a relay or the like is used to connect the terminal 1 that is located at a position remote from the vehicle 3 to the vehicle 3 in an unauthorized manner.

The vehicle 3 includes a system controller 5 that manages the operation of the vehicle 3. The system controller 5 includes various types of devices such as a CPU, a ROM, a RAM, and the like. The system controller 5 may control the operation of the position detection system 4. The system controller 5 of the present example may also control, for example, the operation of an electronic key system of the vehicle 3. The electronic key system permits or executes the actions of an onboard door locking device and an engine device when key ID verification is accomplished through wireless communication between, for example, an electronic key serving as the terminal 1 and the vehicle 3.

The terminal 1 includes a terminal controller 6 that controls the operation of the terminal 1. In a case where the terminal 1 is an electronic key, the terminal controller 6 executes ID verification in which a key ID registered in its memory is authenticated through wireless communication with the system controller 5.

The position detection system 4 includes a first communication device 10 that executes position detection actions in the vehicle 3 and a second communication device 11 that executes position detection actions in the terminal 1. Multiple first communication devices 10 are arranged in the vehicle 3 to establish position detection communication regardless of where the second communication device 11 of the terminal 1 is positioned in the vehicle 3. The first communication device 10 and the second communication device 11 transmit and receive radio waves in, for example, the ultra-wideband (UWB) to measure the distance between the two devices. In the present example, the first communication device 10 serves as an anchor that is a primary device for the position detection communication, and the second communication device 11 serves as a tag that is a subordinate device in the position detection communication. Radio waves in the UWB are used in distance measurement communication to measure the distance between the first communication device 10 and the second communication device 11 with high resolution.

Each first communication device 10 includes a communication controller 12 that controls distance measurement communication actions and an antenna 13 that transmits and receives UWB radio waves. The communication controller 12 stores a unique first communication device ID (not shown) in a memory or the like as ID information unique to the first communication device 10. The first communication device 10 is, for example, wire-connected to the system controller 5.

The second communication device 11 includes a communication controller 14 that controls distance measurement communication actions and an antenna 15 that transmits and receives UWB radio waves. The communication controller 14 stores a unique second communication device ID (not shown) in a memory or the like as ID information unique to the second communication device 11. The second communication device 11 is connected to the terminal controller 6 and controlled by the terminal controller 6.

The position detection system 4 includes a measurement unit 18 that obtains a measurement value Dx in accordance with the positional relationship of the first communication device 10 and the second communication device 11. The measurement unit 18 of the present example includes a first measurement unit 18a that is arranged in the communication controller 12 of each first communication device 10 and a second measurement unit 18b that is arranged in the communication controller 14 of the second communication device 11. The measurement unit 18 obtains a measurement value Dx related to transmission and reception of radio waves from when UWB radio waves for distance measurement are transmitted from one of the first communication device 10 and the second communication device 11 to the other one of the first communication device 10 and the second communication device 11 to when the one of the first communication device 10 and the second communication device 11 receives a response to the radio waves to detect a positional relationship of the first communication device 10 and the second communication device 11. The measurement unit 18 of the present example obtains multiple measurement values Dx by performing communication to obtain a measurement value Dx a multiple number of times in which a parameter Pt of the communication is changed. The communication parameter Pt of the present example indicates a processing time necessary for the second communication device 11 to transmit a response upon reception of radio waves from the first communication device 10.

The position detection system 4 includes a correction unit 19 that corrects the measurement value Dx obtained by the measurement unit 18. The correction unit 19 of the present example is arranged in the communication controller 12 of the first communication device 10. The correction unit 19 of the present example obtains a deviation amount $\Delta K$ between the radio waves transmitted from one of the first communication device 10 and the second communication device 11 and ideal radio waves that are to be transmitted. The deviation amount $\Delta K$ is caused by a clock error in at least one of the first communication device 10 and the second communication device 11. The deviation amount $\Delta K$ may be, for example, a frequency error $\Delta f$ in the transmitted UWB radio waves. The ideal radio waves may be radio waves that are transmitted when there is no clock error. The correction unit 19 corrects a measurement value Dx based on the deviation amount $\Delta K$.

The position detection system 4 includes a validity determination unit 20 that determines the validity of the positional relationship of the first communication device 10 and the second communication device 11 based on the measurement value Dx. The validity determination unit 20 is arranged in the communication controller 12 of the first communication device 10. The validity determination unit 20 of the present example determines the validity of the positional relationship of the first communication device 10 and the second communication device 11 based on the measurement value Dx that is corrected by the correction unit 19. The validity determination unit 20 compares the measurement value Dx with a threshold value Dk to determine positional relationship validity. The validity determination unit 20 determines that the positional relationship is valid when the measurement value Dx is less than the threshold value Dk and that the positional relationship is invalid when the measurement value Dx is greater than or equal to the threshold value Dk. Each of the first communication devices 10 and the second communication device 11 executes the series of processes for the position detection communication and the positional relationship determination described above.

The operation and advantages of the position detection system 4 in the present embodiment will now be described with reference to FIGS. 2 to 4.

Figure 2:
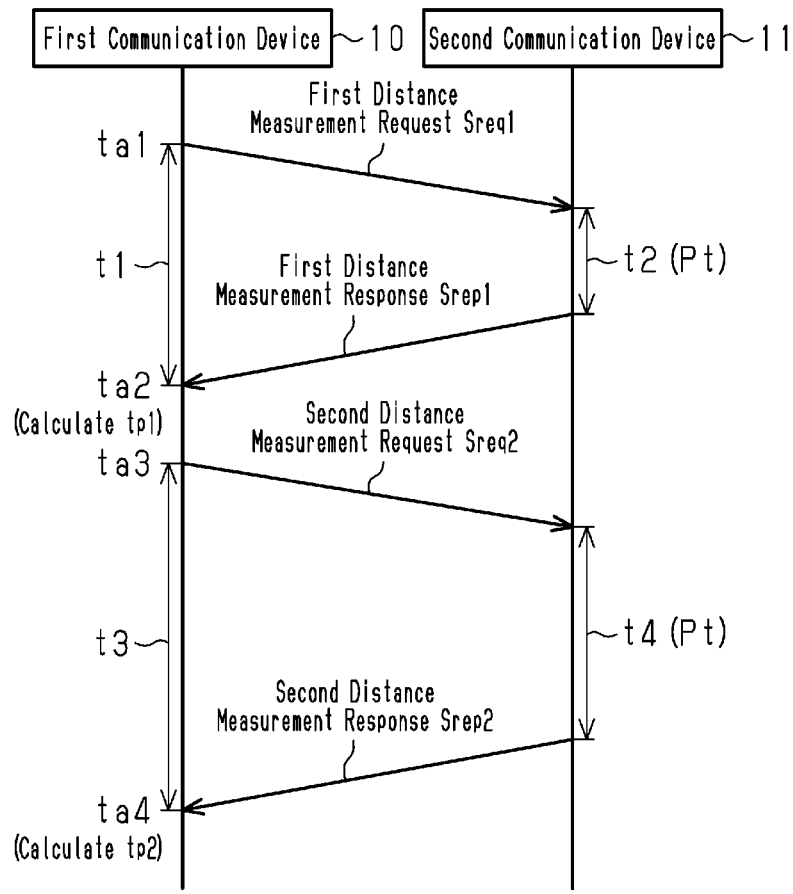
FIG. 2 is a sequence diagram of position detection communication.

As shown in FIG. 2, the first measurement unit 18a of the first communication device 10 functions as the primary device and transmits a first distance measurement request (hereafter referred to as first distance measurement request Sreq1) from the antenna 13 as UWB radio waves that starts distance measurement communication. The first distance measurement request Sreq1 may be, for example, UWB radio waves including an instruction to start distance measurement. The first measurement unit 18a uses, for example, a timer or the like of a CPU arranged in the communication controller 12 to store a transmission time ta1, which indicates the time when the first distance measurement request Sreq1 was transmitted.

When the second measurement unit 18b of the second communication device 11 receives, with the antenna 15, the first distance measurement request Sreq1 transmitted from the first communication device 10, the second measurement unit 18b transmits a first distance measurement response Srep1 from the antenna 15 on UWB radio waves in response to the first distance measurement request Sreq1. The first distance measurement response Srep1 may be radio waves including, for example, information indicating that the first distance measurement request Sreq1 was correctly received. The second measurement unit 18b transmits the first distance measurement response Srep1 to the first communication device 10 after the time used to process a response (hereafter referred to as response processing time t2) elapses from when the first distance measurement request Sreq1 was received. The response processing time t2 is set to a fixed time length determined in advance.

When the first measurement unit 18a receives, with the antenna 13, the first distance measurement response Srep1 transmitted from the second communication device 11, the first measurement unit 18a uses, for example, a timer or the like of a CPU arranged in the first communication device 10 to check a reception time ta2, which indicates the time at which the first distance measurement response Srep1 was received. The first measurement unit 18a recognizes the response processing time t2 in advance. Thus, the first measurement unit 18a calculates t1, which is the time elapsed from the transmission time ta1 to the reception time ta2, and uses the response processing time t2, which is recognized in advance, to calculate tp1, which indicates a propagation time of UWB radio waves, as a measurement value Dx (for example, first measurement value). In the present example, the propagation time tp1 is calculated by subtracting t2 from t1 (tp1=t1−t2).

Figure 3:
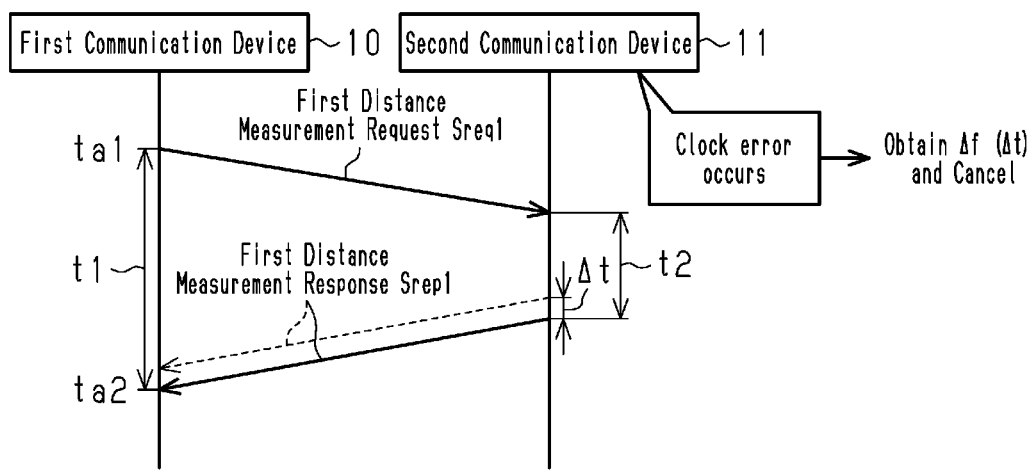
FIG. 3 is a communication sequence diagram when a second communication device has a clock error.

As shown in FIG. 3, the response processing time t2 may be shortened by an error time Δt from the value set in advance due to, for example, a clock error in the CPU of the second communication device 11. In this case, the elapsed time t1 is also shortened by the error time Δt. Thus, the propagation time tp1, which is calculated by the first measurement unit 18a using the response processing time t2, which is recognized in advance, is expressed as (t1−Δt)−t2=tp1−Δt, and the calculated propagation time tp1 is shortened from the proper value by the error time Δt. This may hinder the detection of unauthorized communication when a relay is used.

In this respect, the correction unit 19 corrects the propagation time tp1. In the present example, the correction unit 19 obtains a difference in frequency between the first distance measurement response Srep1 that is received from the second communication device 11 and the ideal radio waves of the first distance measurement response Srep1 that is recognized in advance. The correction unit 19 measures the difference, that is, a frequency error Δf as the deviation amount ΔK.

The frequency of the first distance measurement response Srep1 can be represented by f. In this case, f+Δf and t2−Δt are inversely proportional. Thus, the correction unit 19 obtains the error time Δt by measuring the frequency error Δf and corrects the propagation time tp1 using the frequency error Δf. This obtains an accurate propagation time tp1 that is not affected by the clock error in the second communication device 11.

Referring to FIG. 2, the measurement unit 18 performs communication to obtain a measurement value Dx again. In the communication, the response process time t2 is changed to the response process time t4, which is required for the second communication device 11 to transmit a response to radio waves transmitted from the first communication device 10 to the second communication device 11. In the present example, the first measurement unit 18a transmits a second distance measurement request (hereafter referred to as second distance measurement request Sreq2) from the antenna 13. The first measurement unit 18a uses, for example, a timer or the like of the CPU arranged in the communication controller 12 to store a transmission time ta3, which indicates the time when the second distance measurement request Sreq2 was transmitted.

When the second measurement unit 18b of the second communication device 11 receives, with the antenna 15, the second distance measurement request Sreq2 from the first communication device 10, the second measurement unit 18b transmits a second distance measurement response Srep2 from the antenna 15 on UWB radio waves in response to the second distance measurement request Sreq2. In this case, the second measurement unit 18b transmits the second distance measurement response Srep2 to the first communication device 10 after a time differing from when the first distance measurement response Srep1 was transmitted (hereafter referred to as response processing time t4) elapses. The response process time t4 may be set to be, for example, two times longer than the response process time t2.

Further, the first communication device 10 may notify the second communication device 11 of the response process time t4 during the process of, for example, position detection communication. For example, information on the response process time t4 may be included in the transmitted first distance measurement request Sreq1 or the transmitted second distance measurement request Sreq2 to notify the time when the second distance measurement response Srep2 was transmitted. Further, the response process time t4 may be notified to the communication counterpart over an electronic key system communication network during the process of, for example, smart communication. Further, the response process time t4 may be set to a fixed value determined in advance.

When the first measurement unit 18a receives, with the antenna 13, the second distance measurement response Srep2 transmitted from the second communication device 11, the first measurement unit 18a uses, for example, a timer or the like of the CPU arranged in the first communication device 10 to check a reception time ta4, which indicates the time at which the second distance measurement response Srep2 was received. The first measurement unit 18a recognizes the response processing time t4 in advance. Thus, the first measurement unit 18a calculates t3, which is the time elapsed from the transmission time ta3 to the reception time ta4, and uses the response processing time t4, which is recognized in advance, to calculate tp2, which indicates a propagation time of UWB radio waves, as a measurement value Dx (for example, second measurement value). In the present example, the propagation time tp2 is calculated by subtracting t4 from t3 (tp2=t3−t4).

The response processing time t4 may be shortened by an error time Δt from the value set in advance due to, for example, a clock error in the CPU of the first communication device 10. In this case, the elapsed time t3 is also shortened by the error time Δt. Thus, the propagation time tp2, which is calculated by the first measurement unit 18a using the response processing time t4, which is recognized in advance, is expressed as (t3−Δt)−t4=tp2−Δt, and the calculated propagation time tp2 is shortened from the proper value by the error time Δt. This may hinder the detection of unauthorized communication when a relay is used.

In this respect, the correction unit 19 corrects the propagation time tp2. The correction is performed in the same manner as when the propagation time tp1 is corrected and thus will not be described in detail. An accurate propagation time tp2 that is not affected by the clock error in the second communication device 11 is obtained in this manner.

The validity determination unit 20 determines the validity of communication based on the propagation times tp1, tp2 that are measurement values Dx corrected by the correction unit 19. In this case, the validity determination unit 20 compares the propagation times tp1, tp2 with the threshold value Dk. The validity determination unit 20 determines that the positional relationship of the first communication device 10 and the second communication device 11 is invalid when at least one of the propagation times tp1, tp2 is greater than or equal to the threshold value Dk. Thus, even when a relay or the like is used to perform communication in an unauthorized manner, the communication will be determined as being unauthorized. Thus, communication will not be established.

Figure 4:
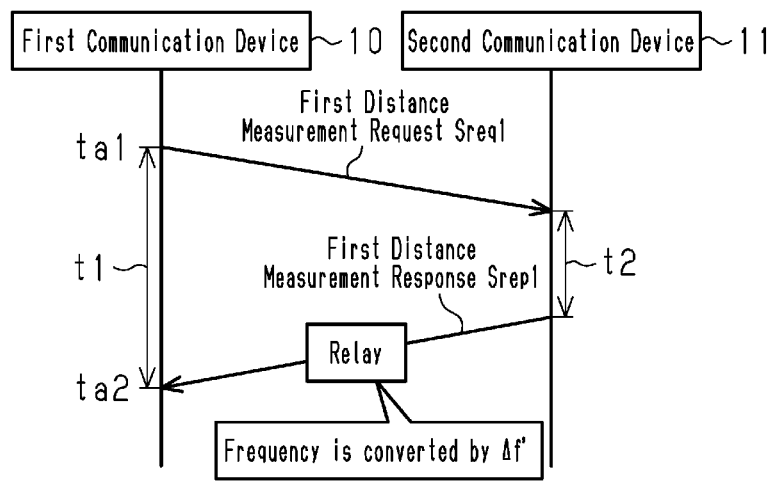
FIG. 4 is a communication sequence diagram of unauthorized communication using a relay.

As shown in FIG. 4, when a relay is used to perform unauthorized communication in the first communication in which, for example, the first distance measurement request Sreq1 and the first distance measurement response Srep1 are transmitted, the frequency of the first distance measurement response Srep1 may be changed by an amount corresponding to a conversion value Δf' to slightly lower the frequency to f+Δf−Δf'. In this case, the first communication device 10 will acknowledge the response processing time t2 as being a relatively long value of t2−Δt+Δt'. Thus, a short measured propagation time tp1 will be calculated, and unauthorized communication using the relay may be established.

The first distance measurement response Srep1 transmitted from the second communication device 11 to the first communication device 10 may be frequency-converted during unauthorized communication. In this case, when the response process time t4 is set to two times longer than the response process time t2, Δt' will be approximately two times greater as long as Δf' remains unchanged when the second distance measurement response Srep2 is transmitted. Thus, the propagation time tp1, which is the first measurement value will differ from and not match the propagation time tp2, which is the second measurement value. Accordingly, the consistency of the propagation times tp1, tp2 can be checked to counter an attack that frequency-converts the first distance measurement response Srep1 transmitted from the second communication device 11 to the first communication device 10.

The validity determination unit 20 determines that the positional relationship of the first communication device 10 and the second communication device 11 is valid when the propagation times tp1, tp2 match or are values approximate to each other as long as the propagation times tp1, tp2 are both less than or equal to the threshold value Dk. Thus, when, for example, ID verification executed through wireless communication with the terminal 1, which serves as an electronic key, is accomplished between the vehicle 3 and the terminal 1, the ID will be verified. In this case, the locking and unlocking of a vehicle door of the vehicle 3 will be performed or permitted. Alternatively, the starting of the engine of the vehicle 3 will be permitted.

The validity determination unit 20 determines that the positional relationship of the first communication device 10 and the second communication device 11 is invalid when the propagation times tp1, tp2 do not match or are not values approximate to each other irrespective of the comparison result of the propagation times tp1, tp2 with the threshold value Dk. Thus, when undergoing an attack that frequency-converts the first distance measurement response Srep1 transmitted from the second communication device 11 to the first communication device 10, the communication will be determined as being unauthorized. In this case, communication will not be established. This improves the security of position detection communication.

The first embodiment has the following advantages.

Even when communication between the first communication device 10 and the second communication device 11 is subjected to an act of unauthorized connection using, for example, a relay involving frequency conversion, inconsistency will be detected during any one of the communication events with a communication parameter Pt that is changed for each communication event. In the present example, the parameter Pt indicates a response process time measured from when a distance measurement request is received to when a distance measurement response is transmitted. In the present example, the parameter Pt is changed from a first parameter (response process time t2) to a second parameter (response process time t4). This allows for detection of unauthorized communication performed with a frequency-converting relay such as that described above and improves the detection accuracy of unauthorized communication.

The first measurement unit 18a and the second measurement unit 18b measure propagation times tp1, tp2 of radio waves that are different measurement values Dx. Thus, the positional relationship is accurately detected from the propagation times tp1, tp2 of radio waves measured during communication between the first communication device 10 and the second communication device 11.

The position detection system 4 includes the correction unit 19 and obtains a frequency error Δf as a deviation amount ΔK, which is caused by a clock error in the first communication device 10 and the second communication device 11. The correction unit 19 corrects a measurement value Dx based on the frequency error Δf. The optimized measurement value Dx is further advantageous for improving accuracy when determining the positional relationship.

The position detection system 4 includes the validity determination unit 20 that determines the validity of the positional relationship of the first communication device 10 and the second communication device 11 based on a measurement value Dx that is corrected by the correction unit 19. The determination of the validity of the positional relationship based on the corrected measurement value Dx allows for accurate determination of the positional relationship validity.

The measurement unit 18 obtains the measurement value Dx a multiple number of times through communication. The communication is performed using the response process time t2 and then the response process time t4, which is measured from when one of the first communication device 10 and the second communication device 11 receives radio waves transmitted from the other one of the first communication device 10 and the second communication device 11 to when the one of the first communication device 10 and the second communication device 11 transmits a response to the radio waves. Thus, communication in which radio waves are transmitted and received between the first communication device 10 and the second communication device 11 can be performed a multiple number of times with the parameter Pt changed each time by using different response process times t2, t4, which serve as the parameters Pt. This improves the detection accuracy of unauthorized communication with a simple method.

Second Embodiment

A second embodiment will now be described with reference to FIG. 5. The second embodiment differs from the first embodiment in how the positional relationship is determined. Thus, the same reference numerals are given to those components that are the same as the corresponding components of the first embodiment. Such components will not be described in detail, and the description will focus on the differences.

Figure 5:
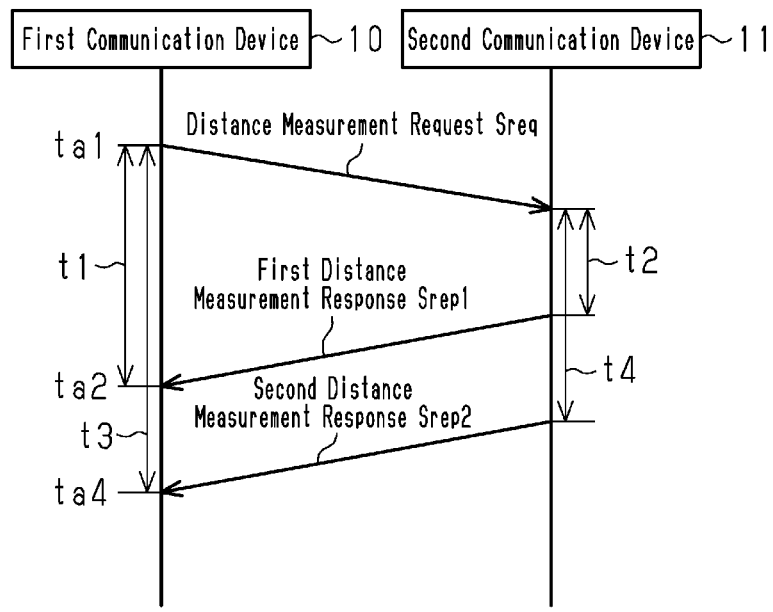
FIG. 5 is a sequence diagram of position detection communication in a second embodiment.

As shown in FIG. 5, the first measurement unit 18a of the first communication device 10 functions as the primary device and transmits a distance measurement request Sreq from the antenna 13 as UWB radio waves that starts distance measurement communication. The distance measurement request Sreq may be, for example, UWB radio waves including an instruction to start distance measurement. The first measurement unit 18a uses, for example, a timer or the like of a CPU arranged in the communication controller 12 to store a transmission time ta1, which indicates the time when the distance measurement request Sreq was transmitted.

When the second measurement unit 18b of the second communication device 11 receives, with the antenna 15, the distance measurement request Sreq transmitted from the first communication device 10, the second measurement unit 18b transmits a first distance measurement response Srep1 from the antenna 15 on UWB radio waves in response to the distance measurement request Sreq. The second measurement unit 18b transmits the first distance measurement response Srep1 to the first communication device 10 after the time used to process a response (response processing time t2) elapses from when the distance measurement request Sreq was received.

When the first measurement unit 18a receives, with the antenna 13, the first distance measurement response Srep1 transmitted from the second communication device 11, the first measurement unit 18a uses, for example, a timer or the like of a CPU arranged in the first communication device 10 to check a reception time ta2, which indicates the time at which the first distance measurement response Srep1 was received. The first measurement unit 18a calculates t1, which is the time elapsed from the transmission time ta1 to the reception time ta2, and uses the response processing time t2, which is recognized in advance, to calculate tp1 (=t1−t2), which indicates a propagation time of UWB radio waves.

When one of the first communication device 10 and the second communication device 11 receives the radio waves and transmits a response to the other one of the first communication device 10 and the second communication device 11, the measurement unit 18 of the present example obtains multiple measurement values Dx by transmitting responses a multiple number of times. In the present example, the second measurement unit 18b transmits distance measurement responses a multiple number of times (twice in the present example) in a single communication event. Thus, the measurement unit 18 obtains two measurement values Dx in the single communication event.

In the present example, the second measurement unit 18b of the second communication device 11 transmits a second distance measurement response Srep2 to the first communication device 10 when a preset time (hereafter referred to as response process time t4) elapses after the first distance measurement response Srep1 was transmitted. The response process time t4 may be set to be, for example, two times longer than the response process time t2.

When the first measurement unit 18a receives, with the antenna 13, the second distance measurement response Srep2 transmitted from the second communication device 11, the first measurement unit 18a uses, for example, a timer or the like of the CPU arranged in the first communication device 10 to check a reception time ta4, which indicates the time at which the second distance measurement response Srep2 was received. The first measurement unit 18a recognizes the response processing time t4 in advance. Thus, the first measurement unit 18a calculates t3, which is the time elapsed from the transmission time ta1 to the reception time ta4, and uses the response processing time t4, which is recognized in advance, to calculate tp2, which indicates a propagation time of UWB radio waves. The propagation time tp2 is calculated by subtracting t4 from t3 (tp2=t3−t4).

The first distance measurement response Srep1 transmitted from the second communication device 11 to the first communication device 10 may be frequency-converted during unauthorized communication. In this case, when the response process time t4 is two times longer than the response process time t2, Δt' will be two times greater as long as Δf' remains unchanged when the second distance measurement response Srep2 is transmitted. Thus, the propagation time tp1, which is the first measurement value, will differ from and not match the propagation time tp2, which is the second measurement value. Accordingly, the consistency of the propagation times tp1, tp2 can be checked to detect an attack that frequency-converts the first distance measurement response Srep1 transmitted from the second communication device 11 to the first communication device 10.

In addition to the advantages of the first embodiment, the second embodiment has the following advantages.

When one of the first communication device 10 and the second communication device 11 transmits radio waves and the other one of the first communication device 10 and the second communication device 11 receives the radio waves and then transmits a response to the radio waves, the measurement unit 18 obtains multiple measurement values Dx by transmitting responses a multiple number of times. Accordingly, unauthorized communication can be detected by only transmitting responses a multiple number of times. This improves the detection accuracy of unauthorized communication while minimizing the power consumed for communication.

The above-described embodiments may be modified as follows. The above-described embodiments and the following modifications can be combined as long as the combined modifications remain technically consistent with each other.

Measurement Unit 18

Figure 6:
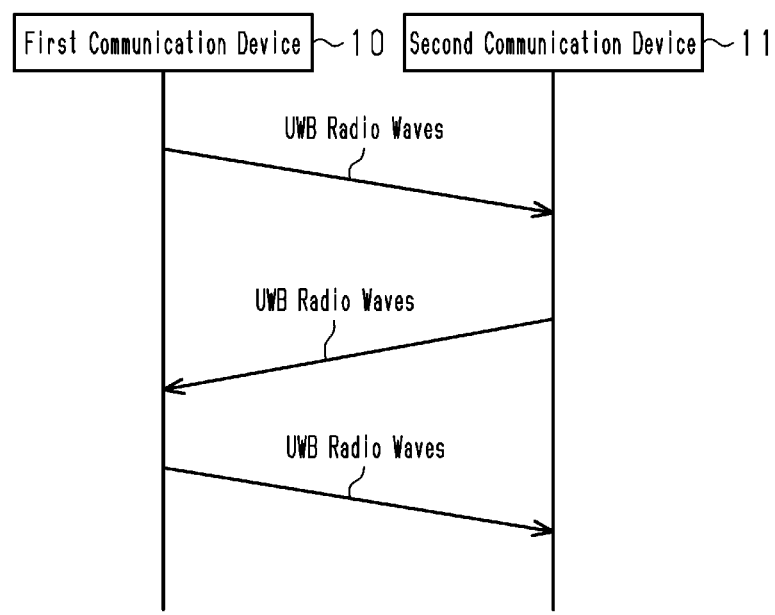
FIG. 6 is a communication sequence diagram in a modification.

As shown in FIG. 6, the UWB radio waves may be transmitted from the first communication device 10 to the second communication device 11, then from the second communication device 11 to the first communication device 10, and then again from the first communication device 11 to the second communication device 11 to obtain a measurement value Dx from the series of transmission processes. The three-message communication is further advantageous for improving accuracy when determining the validity of a positional relationship.

In each embodiment, the first measurement unit 18a does not need to be arranged in the first communication device 10. Instead, the first measurement unit 18a may be arranged, for example, in the controller 5 or one of other onboard members.

In each embodiment, the second measurement unit 18b does not need to be arranged in the second communication device 11. Instead, the second measurement unit 18b may be arranged, for example, in the terminal controller 6 or one of other members of the terminal 1.

In each embodiment, the measurement unit 18 may be arranged in only one of the terminal 1 and the vehicle 3.

Measurement Value Dx

In each embodiment, a measurement value Dx is not limited to propagation times tp1, tp2. Instead, the measurement value Dx may be a received signal strength when radio waves are received.

In each embodiment, a measurement value Dx is not limited to propagation times tp1, tp2. Instead, the measurement value Dx may be a parameter that allows the positional relationship to be checked.

Parameter Pt

In each embodiment, the response process times t2, t4 that serve as parameters Pt may be set to any type of time when their lengths are changed.

In each embodiment, the response process time t4 does not need to be set to two times greater than the response process time t2. Instead, the response process time t4 may be set to one of other values.

In each embodiment, the parameter Pt does not need to be time. Instead, the parameter Pt may be any parameter as long as the parameter Pt is related to communication.

Communication Performed Multiple Times

In each embodiment, the communication performed a multiple number of times may be any communication as long as the communication is performed a multiple number of times with different communication parameters.

In each embodiment, communication may be performed a multiple number of times with, for example, different types of parameters.

In each embodiment, communication does not need to be performed twice. Instead, communication may be performed three times or more.

First Communication Device 10

In each embodiment, the first communication device 10 may be incorporated into the system controller 5.

In each embodiment, the first communication device 10 may be retrofitted to the vehicle 3.

In each embodiment, the first communication device 10 does not need to be arranged in vehicle 3. Instead, the first communication device 10 may be installed in various types of devices or machines.

Second Communication Device 11

In each embodiment, the second communication device 11 may be incorporated into the terminal controller 6 of the terminal 1.

In each embodiment, the second communication device 11 may be installed in a high-performance mobile phone in advance.

Validity Determination Unit 20

In each embodiment, the validity determination unit 20 may be arranged in the terminal 1.

In each embodiment, the validity determination unit 20 may be arranged in the system controller 5 or the terminal controller 6.

Correction Unit 19

In each embodiment, the correction unit 19 does not need to detect an error from a frequency deviation of radio waves. Instead, the correction unit 19 may detect an error using a parameter other than frequency.

In each embodiment, a deviation amount ΔK is not limited to a frequency error Δf. Instead, the deviation amount ΔK may be a different parameter.

In each embodiment, the correction unit 19 may be omitted from the position detection system 4.

Position Detection System 4

In each embodiment, the validity determination unit 20 may be arranged in the terminal 1 to determine the validity of a measurement value.

In each embodiment, the second communication device 11 may transmit radio waves to the first communication device 10 and execute position detection.

In each embodiment, when multiple first communication devices 10 are installed in a vehicle body, the position detection system 4 preferably communicates with each first communication device 10 and measures the distance. In this case, the position detection system 4 preferably determines whether the positional relationship is valid by checking each distance.

In each embodiment, the measurement of position does not need to be performed through UWB communication. Instead, the measurement may be performed using Bluetooth (registered trademark). In this case, the received signal strength of radio waves may be measured for each channel of radio waves transmitted in Bluetooth communication, and the positional relationship of the two devices may be determined from the received signal strengths.

In each embodiment, position detection communication does not need to be performed at a time differing from smart communication. Position detection communication may be performed at the same time as smart communication.

In each embodiment, during position detection communication, for example, one of the first communication device 10 and the second communication device 11 may solely transmit UWB radio waves to obtain a position from a propagation time of the UWB radio waves that are reflected by an object and returned to the transmitting device.

In each embodiment, to determine the positional relationship using radio waves in UWB communication, the positional relationship may be estimated from, for example, the time required to transmit and receive radio waves or from the direction in which radio waves travel. Further, to determine the positional relationship using radio waves in Bluetooth communication, the positional relationship may be estimated from, for example, the propagation characteristics of radio waves, the received signal strength of radio waves, the time required to transmit and receive radio waves, the direction in which radio waves travel, or with the use of an array antenna.

In each embodiment, a specific one of multiple first communication devices 10 may serve as a master and the other ones may serve as slaves. In this case, the first communication devices 10 that serve as the slaves may communicate with the system controller 5 via the first communication device 10 that serves as the master.

Electronic Key System

In each embodiment, the electronic key system may be a smart verification system, a wireless key system, or an immobilizer system.

In each embodiment, the frequency of radio waves used for the electronic key system is not limited to the low frequency (LF) band or the ultra-high frequency (UHF) band. Instead, radio waves may be on other frequencies.

In each embodiment, the electronic key system may perform communication through, for example, short-range wireless communication, such as Bluetooth (registered trademark) or radio frequency identification (RFID), or communication using infrared light or the like.

In each embodiment, the electronic key system may share the position detection system 4. In this case, communication for position detection and determination are executed as the terminal 1 is verified in UWB communication.

Others

In each embodiment, the terminal 1 is not limited to an electronic key or a high-performance mobile phone. Instead, the terminal 1 may be any type of key to the operated subject 2.

In each embodiment, the operated subject 2 is not limited to the vehicle 3. Instead, the operated subject 2 may be any of various types of devices or machines.

The invention claimed is:

1. A position detection system, comprising:
 a measurement unit that obtains a measurement value related to transmission and reception of radio waves from when the radio waves are transmitted from one of a first communication device and a second communication device to the other one of the first communication device and the second communication device to when the one of the first communication device and the second communication device receives a response to the radio waves to detect a positional relationship of the first communication device and the second communication device, wherein the measurement unit obtains multiple measurement values by performing communication to obtain the measurement value a multiple number of times in which a parameter of the communication is changed each time the communication is performed, and wherein the parameter of the communication is a response process time from when one of the first communication device and the second communication device receives the radio waves transmitted from the other one of the first communication device and the second communication device to when the one of the first communication device and the second communication device transmits a response to the radio waves; and the position detection system further comprising a correction unit that obtains a deviation amount, which is caused by a clock error in at least one of the first communication device and the second communication device, by comparing radio waves transmitted from the one of the first communication device and the second communication device to the other one of the first communication device and the second communication device with ideal radio waves that are to be transmitted, and corrects the measurement value, which is related to the deviation amount, based on the deviation amount, wherein the position detection system detects the positional relationship of the first communication device and the second communication device based on the measurement value that is corrected by the correction unit.

2. The position detection system according to claim 1, wherein the measurement unit measures a propagation time of the radio waves as the measurement value.

3. The position detection system according to claim 1, further comprising:
a validity determination unit that determines whether the positional relationship of the first communication device and the second communication device is valid, wherein the validity determination unit acquires, as a first measurement value, the measurement value that is obtained during communication performed when the parameter is set to a first parameter, the validity determination unit acquires, as a second measurement value, the measurement value that is obtained during communication performed when the parameter is set to a second parameter, the validity determination unit determines that the positional relationship is valid when the first measurement value and the second measurement value are consistent and the first measurement value and the second measurement value are both less than a threshold value, and the validity determination unit determines that the positional relationship is invalid when the first measurement value and the second measurement value are inconsistent irrespective of a comparison result of the first measurement value and the second measurement value with the threshold value.

4. The position detection system according to claim 1, further comprising:
a validity determination unit that determines whether the positional relationship of the first communication device and the second communication device is valid based on the measurement value that is corrected by the correction unit.

5. The position detection system according to claim 1, wherein when one of the first communication device and the second communication device transmits the radio waves and the other one of the first communication device and the second communication device receives the radio waves and then transmits a response to the radio waves, the measurement unit transmits the response a multiple number of times to obtain the measurement value a multiple number of times.

6. A method for detecting a position, the method comprising:
obtaining a measurement value related to transmission and reception of radio waves with a measurement unit from when one of a first communication device and a second communication device transmits radio waves to the other one of the first communication device and the second communication device to when the one of the first communication device and the second communication device receives a response to the radio waves to detect a positional relationship of the first communication device and the second communication device, wherein the obtaining a measurement value includes obtaining multiple measurement values with the measurement unit by performing communication to obtain the measurement value a multiple number of times in which a parameter of the communication is changed each time the communication is performed, and wherein the parameter of the communication is a response process time from when one of the first communication device and the second communication device receives the radio waves transmitted from the other one of the first communication device and the second communication device to when the one of the first communication device and the second communication device transmits a response to the radio waves;

the method further comprising:
obtaining a deviation amount, which is caused by a clock error in at least one of the first communication device and the second communication device, by comparing radio waves transmitted from the one of the first communication device and the second communication device to the other one of the first communication device and the second communication device with ideal radio waves that are to be transmitted;

correcting the measurement value, which is related to the deviation amount, based on the deviation amount; and detecting the positional relationship of the first communication device and the second communication device based on the measurement value that is corrected.

* * * * *